(12) United States Patent
Wang et al.

(10) Patent No.: US 12,173,739 B2
(45) Date of Patent: Dec. 24, 2024

(54) CONNECTOR

(71) Applicant: ILLINOIS TOOL WORKS INC., Glenview, IL (US)

(72) Inventors: Xing Wang, Shanghai (CN); Mengli Sun, Shanghai (CN)

(73) Assignee: Illinois Tool Works Inc., Glenview, IL (US)

(*) Notice: Subject to any disclaimer, the term of this patent is extended or adjusted under 35 U.S.C. 154(b) by 251 days.

(21) Appl. No.: 17/716,851

(22) Filed: Apr. 8, 2022

(65) Prior Publication Data

US 2022/0325739 A1     Oct. 13, 2022

(30) Foreign Application Priority Data

Apr. 9, 2021  (CN) .......................... 202110384040.0

(51) Int. Cl.
 *F16B 37/08*    (2006.01)
 *F16B 19/10*    (2006.01)
 *B60R 13/02*    (2006.01)
(52) U.S. Cl.
 CPC ...... *F16B 19/1081* (2013.01); *F16B 37/0857* (2013.01); *B60R 13/0206* (2013.01)
(58) Field of Classification Search
 CPC .......................... F16B 37/043; F16B 37/0857; F16B 37/0842; F16B 21/073
 USPC .................................................. 411/182, 433
 See application file for complete search history.

(56) References Cited

U.S. PATENT DOCUMENTS

| 5,291,639 | A | * | 3/1994 | Baum | F16B 37/0842 24/453 |
|---|---|---|---|---|---|
| 5,302,070 | A | * | 4/1994 | Kameyama | F16B 37/0842 411/437 |
| 5,460,342 | A | * | 10/1995 | Dore | F16L 3/223 248/68.1 |
| 5,782,597 | A | * | 7/1998 | Meyer | F16B 37/0842 411/908 |
| 8,007,029 | B2 | * | 8/2011 | Sano | B62D 35/02 296/180.1 |
| 8,322,001 | B2 | * | 12/2012 | Ehrhardt | F16B 5/123 24/457 |
| 8,894,340 | B2 | * | 11/2014 | Kamiya | F16B 37/0857 24/292 |
| 9,079,536 | B2 | * | 7/2015 | Mulla | F16B 37/0842 |
| 9,284,967 | B2 | * | 3/2016 | Iwahara | F16B 37/0857 |
| 9,500,219 | B2 | * | 11/2016 | Aoshima | F16B 37/0857 |
| 2010/0111642 | A1 | * | 5/2010 | Matsuno | F16B 37/0857 411/508 |

* cited by examiner

*Primary Examiner* — Flemming Saether
(74) *Attorney, Agent, or Firm* — Quarles & Brady LLP

(57) ABSTRACT

A connector having a head that holds a first component and a body connected to the head. The body has a central channel extending along a central axis of the connector, and the central channel receives a fastener. The body has at least two resilient legs. The resilient legs extend obliquely toward the central axis in a direction from the body to the head. The resilient legs engage with the fastener, to attach the connector to the fastener.

10 Claims, 7 Drawing Sheets

CONNECTOR

CROSS REFERENCE TO RELATED APPLICATIONS

This application claims priority to Chinese Application Serial No. 202110384040.0 filed Apr. 9, 2021, the contents of which are incorporated herein by reference in its entirety.

TECHNICAL FIELD

The present disclosure relates to a connector, and more particularly, to a connector used to cooperate with a screw bolt so as to connect two components.

BACKGROUND ART

In the process of mounting a part or component onto a vehicle body, if there are multiple mounting points between the part or component and the vehicle body, an operator needs to complete the mounting operation at each mounting point one by one. During this process, the operator not only needs to manually perform the connection/fastening operation for mounting the part or component, but also needs to keep the part or component in a stationary position relative to the vehicle body by hand, because only in this way, the alignment of each mounting point between the part or component and the vehicle body can be ensured. This makes the mounting process extremely difficult and even requires several staffs to cooperate to complete the mounting operation.

SUMMARY OF THE INVENTION

The present disclosure provides a connector, which can hold a first component, and can cooperate with a screw bolt secured onto a second component to keep the first component in a mounting position relative to the second component, so as to facilitate a subsequent mounting operation (e.g. fastener connection).

To achieve the above objective, the present disclosure provides a connector, comprising: a head configured to be capable of holding a first component; a body connected to the head, wherein the body comprises a central channel extending along a central axis of the connector, and the central channel is configured to receive a fastener; and at least two resilient legs connected to the body, wherein the at least two resilient legs extend obliquely toward the central axis in a direction from the body to the head, and the at least two resilient legs are configured to be engageable with the fastener that is inserted into the central channel, to attach the connector to the fastener.

According to the above content, the body comprises: at least two connecting posts, wherein the at least two connecting posts have first ends connected to the head and extend in a direction parallel to the central axis, and the at least two connecting posts are arranged around the central channel; and a tubular portion connected to second ends of the at least two connecting posts, wherein the tubular portion comprises an inner wall forming a part of the central channel.

According to the above content, the tubular portion comprises a proximal end close to the head and a distal end remote from the head, and the inner wall of the tubular portion is formed, at least in the vicinity of the distal end, in the shape of a truncated cone tapered in a direction from the distal end toward the proximal end.

According to the above content, the tubular portion comprises a cylindrical tube forming the proximal end and a conical tube forming the distal end, the conical tube is connected to the cylindrical tube and is tapered in the direction from the distal end toward the proximal end, and the cylindrical tube has an inner diameter equal to a minimum inner diameter of the conical tube.

According to the above content, the at least two resilient legs are connected to the proximal end of the tubular portion.

According to the above content, the head comprises a main body, and a first flange and a second flange which are arranged around the main body and protrude radially, the first flange and the second flange are spaced apart by a predetermined distance for clamping the first component, and the main body is insertable into an opening of the first component.

According to the above content, the main body of the head is movable in the opening of the first component.

According to the above content, the head comprises a central aperture, and the central aperture is in communication with the central channel of the body and is configured to be capable of receiving the fastener.

According to the above content, the at least two resilient legs each comprise an engagement portion configured to engage the fastener that is inserted into the central channel.

According to the above content, the at least two resilient legs each comprise a bent portion, which is close to a distal end of the resilient leg and protrudes toward the central axis, the bent portion forming the engagement portion.

DETAILED DESCRIPTION OF EMBODIMENTS

Various specific embodiments of the present disclosure are described below with reference to the accompanying drawings which constitute part of this description. It is to be understood that although the terms indicating orientations, such as "front", "rear", "upper", "lower", "left", "right", "top" and "bottom", are used in the present disclosure to describe structural parts and elements in various examples of the present disclosure, these terms are used herein only for ease of illustration and are determined based on the exemplary orientations shown in the accompanying drawings. Since the embodiments disclosed in the present disclosure can be arranged in different directions, these terms indicating directions are only illustrative and should not be considered as limitations.

An embodiment of the present disclosure provides a connector, which is configured to hold a first component (e.g., a handle inner panel of a vehicle) and to be attached to a fastener (e.g. a screw bolt) secured onto a second component (e.g., a vehicle door), so as to keep the first component in a mounting position relative to the second component for facilitating a subsequent mounting operation (e.g. fastening connection).

Figure 1A:
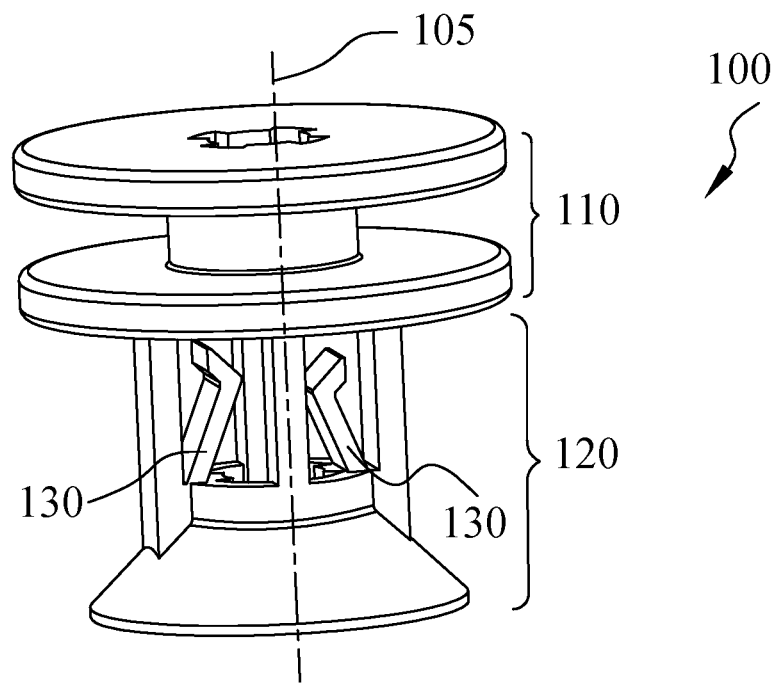
FIG. 1A is a perspective view of an embodiment of a connector according to the present disclosure as viewed from above.
Figure 1B:
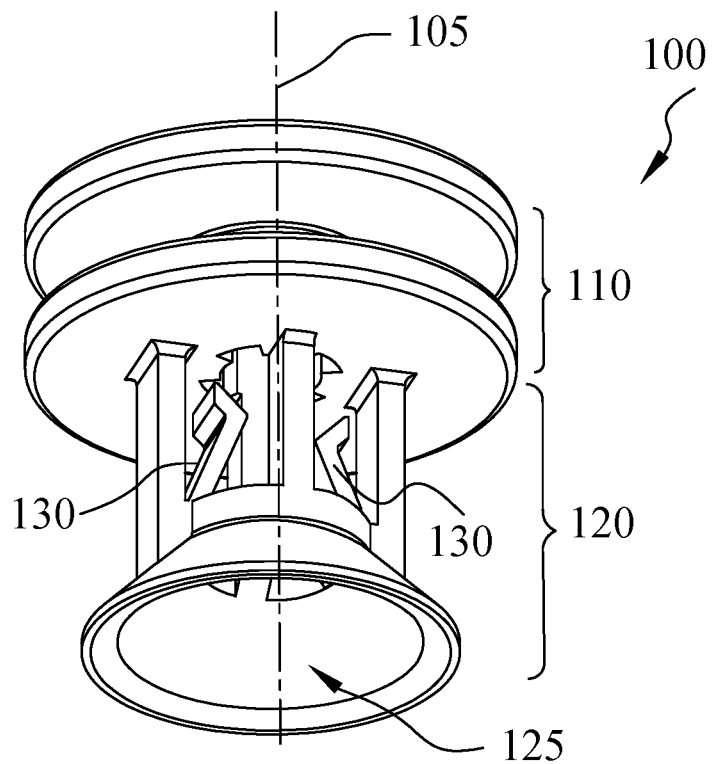
FIG. 1B is a perspective view of the connector shown in FIG. 1A as viewed from below.

FIG. 1A is a perspective view of an embodiment of a connector 100 according to the present disclosure as viewed from above, and FIG. 1B is a perspective view of the connector 100 shown in FIG. 1A as viewed from below, for showing the overall structure of the connector 100. As shown in FIGS. 1A and 1B, the connector 100 comprises a central axis 105 and extends along the central axis 105. The connector 100 comprises a head 110 and a body 120 connected to the head 110, and the body 120 is located below the head 110. The head 110 is configured to be capable of holding a first component 310 (see FIG. 3A). The body 120 comprises a central channel 125 for receiving a fastener 330 (see FIG. 3A). The central channel 125 extends along the central axis 105. The connector 100 further comprises a pair of resilient legs 130. The resilient legs 130 are connected to the body 120 and extend obliquely toward the central axis 105 in a direction from the body 120 to the head 110. The resilient legs 130 can be engaged with the fastener 330 that is inserted into the central channel 125 so that the connector 100 can be attached to the fastener 330 through the engagement of the pair of resilient legs 130 with the fastener 330.

Figure 2A:
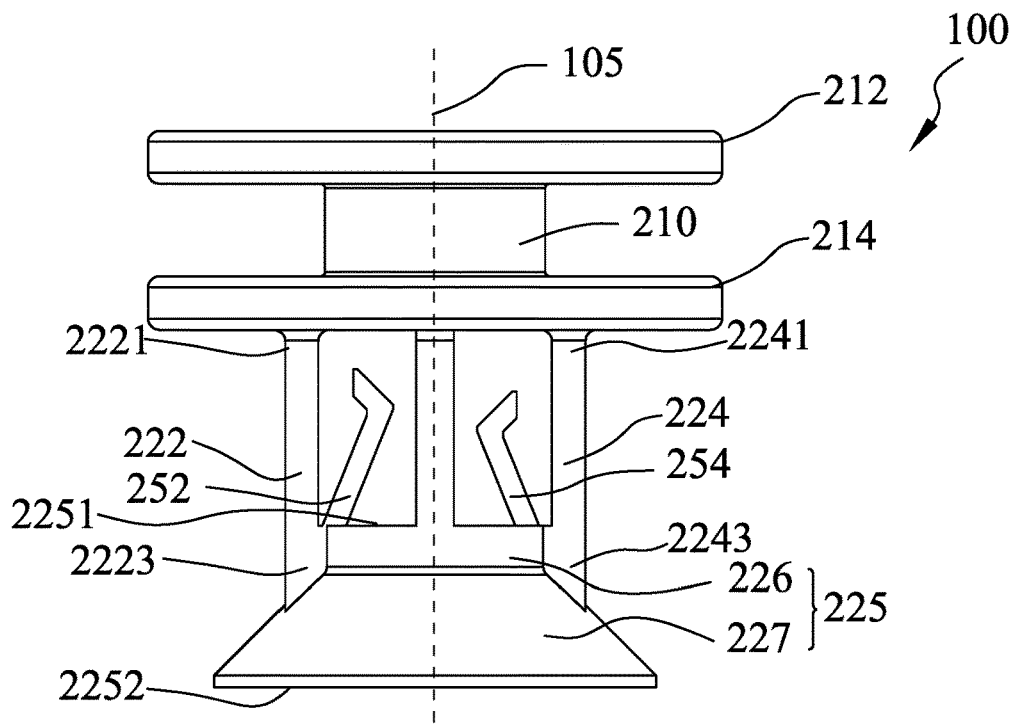
FIG. 2A is a side view of a first side of the connector shown in FIG. 1A.
Figure 2B:
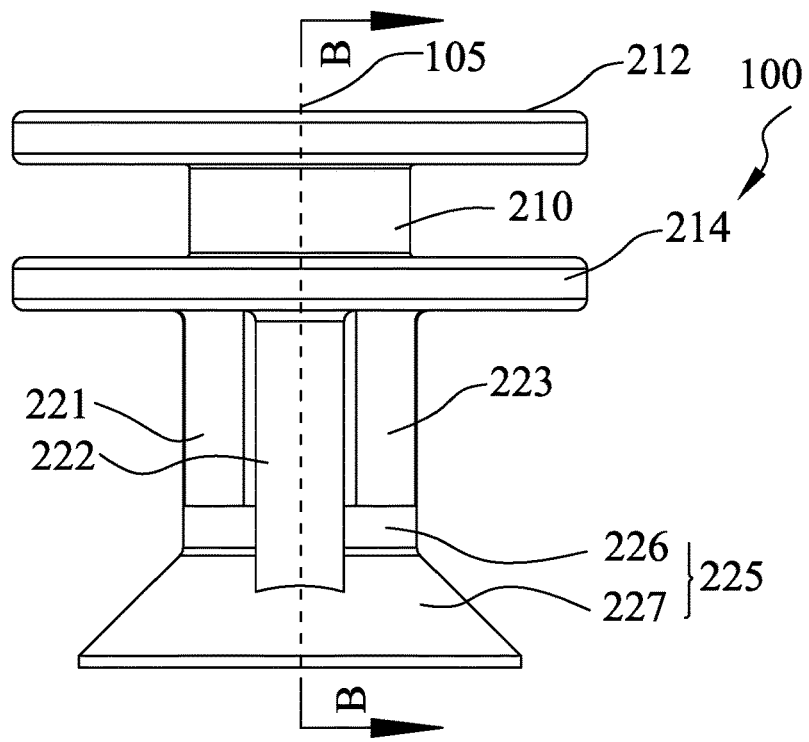
FIG. 2B is a side view of a second side of the connector shown in FIG. 2A.
Figure 2C:
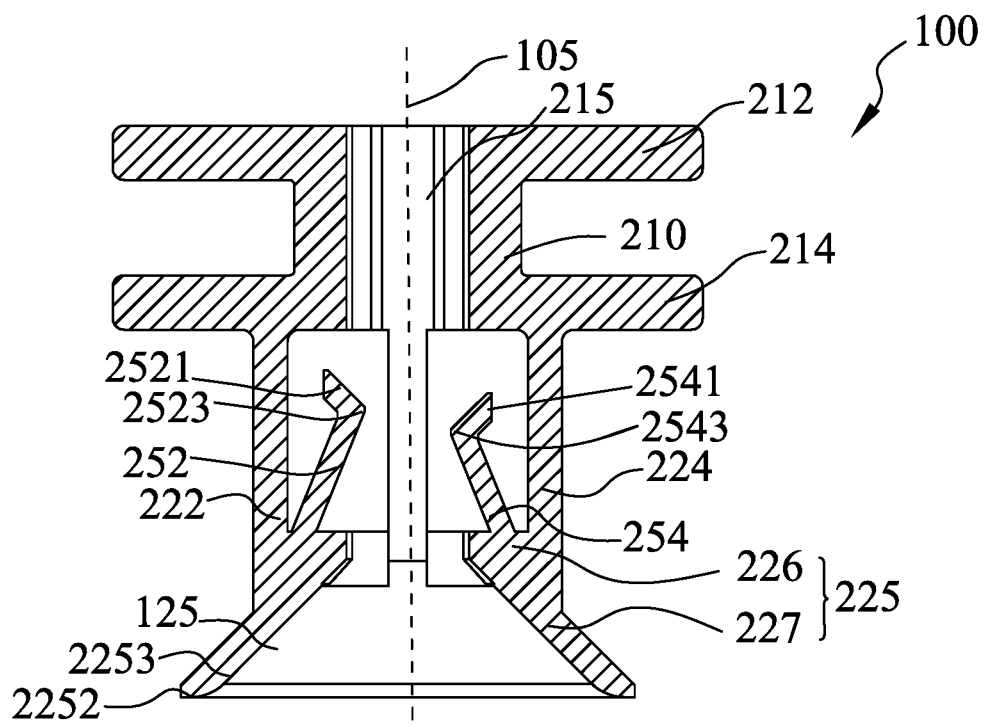
FIG. 2C is a cross-sectional view of the connector shown in FIG. 2A along a line B-B in FIG. 2B.

FIG. 2A is a side view of a first side of the connector 100 shown in FIG. 1A, FIG. 2B is a side view of a second side of the connector 100 shown in FIG. 2A, and FIG. 2C is a cross-sectional view of the connector 100 along a line B-B in FIG. 2B, for showing the specific structures of the head 110, the body 120 and the resilient legs 130 of the connector 100. The second side of the connector 100 is offset by 90 degrees from the first side thereof. That is, by rotating the connector 100 in FIG. 2A about the central axis 105 by 90 degrees, the perspective shown in FIG. 2B can be seen.

As shown in FIGS. 2A-2C, the head 110 comprises a main body 210. The main body 210 extends along the central axis 105, and the main body 210 is generally cylindrical. The head 110 further comprises a first flange 212 and a second flange 214, which are arranged around the main body 210 and protrude radially from the main body 210. The first flange 212 and the second flange 214 are generally annular platforms and are spaced apart from each other by a predetermined distance. The predetermined distance corresponds to the thickness of the first component 310 (see FIG. 3A), so that the first component 310 can be clamped between the first flange 212 and the second flange 214. The main body 210 between the first flange 212 and the second flange 214 is similar to a neck ring that can be inserted into an opening 315 (see FIG. 3A) of the first component 310. In this way, the head 110 can hold the first component 310 and attach same to the second component 320. An upper surface of the first flange 212 is flush with a top surface of the main body 210, and a lower surface of the second flange 214 is flush with a bottom surface of the main body 210, so that the axial section of the head 110 is generally "I" shaped.

The body 120 comprises two pairs of connecting posts 221, 222, 223, 224 and a tubular portion 225. Each of the two pairs of connecting posts 221, 222, 223, 224 extends downward from the lower surface of the second flange 214 of the head 110 in a direction parallel to the central axis 105. A first end (i.e. the top end) of each of the two pairs of connecting posts 221, 222, 223, 224 is connected to the head 110, and a second end (i.e. the bottom end) of each of the two pairs of connecting posts 221, 222, 223, 224 is connected to the tubular portion 225. The two pairs of connecting posts 221, 222, 223, 224 are evenly arranged around the central axis 105. The first pair of connecting posts 222, 224 (see FIG. 2A) are arranged symmetrically with respect to the central axis 105, and the second pair of connecting posts 221, 223 (see FIG. 2B) are arranged symmetrically with respect to the central axis. In conjunction with FIGS. 1A and 1B, it can be seen that the distance between each connecting post of the first pair of connecting posts 222, 224 and the central axis 105 is greater than the distance between each connecting post of the second pair of connecting posts 221, 223 and the central axis 105. The two pairs of connecting posts 221, 222, 223, 224 are all prism-shaped.

The tubular portion 225 of the body 120 comprises a proximal end 2251 close to the head 110 and a distal end 2252 remote from the head 110. The tubular portion 225 comprises a cylindrical tube 226 and a conical tube 227. The cylindrical tube 226 forms the proximal end 2251 and the conical tube 227 forms the distal end 2252. The conical tube 227 is tapered in a direction from the distal end 2252 to the proximal end 2251, and the cylindrical tube 226 is connected to the smaller-size end of the conical tube 227 and is closer to the head 110 than the conical tube 227. As shown in FIG. 2C, the cylindrical tube 226 has an inner diameter substantially equal to the minimum inner diameter of the conical tube 227. The length of the cylindrical tube 226 extending along the central axis 105 is smaller than the length of the conical tube 227 extending along the central axis 105, and the cylindrical tube 226 and the conical tube 227 together form a flared configuration 225. The first ends 2221, 2241 (i.e., the top ends) of the first pair of connecting posts 222, 224 are connected to the lower surface of the second flange 214 of the head 110. The second ends 2223, 2243 (i.e., the bottom ends) of the first pair of connecting posts 222, 224 are connected to an outer surface of the cylindrical tube 226 and a part of an outer surface of the conical tube 227. The second pair of connecting posts 221, 223 are connected to a top surface of the cylindrical tube 226. Therefore, the distance between the first pair of connecting posts 222, 224 is greater than the distance between the second pair of connecting posts 221, 223.

The pair of resilient legs 130 comprises a first resilient leg 252 and a second resilient leg 254. The first resilient leg 252 and the second resilient leg 254 are respectively located on opposite sides of the central axis 105. The proximal ends of the first resilient leg 252 and the second resilient leg 254 are connected to the proximal end 2251 of the tubular portion 225 and extend obliquely toward the central axis 105 in a direction from the tubular portion 225 to the head 110. The first resilient leg 252 and the second resilient leg 254 respectively comprise bent portions 2523 and 2543 close to their distal ends 2521, 2541, and the bent portions 2523 and 2543 protrude toward the central axis 105. That is, during the extension of the first resilient leg 252 and the second resilient leg 254, they are bent outwardly from the extension direction at a position near the distal ends thereof, so as to form the bent portions 2523 and 2543 protruding toward the central axis 105. The bent portions 2523 and 2543 form the engagement portions of the first resilient leg 252 and the second resilient leg 254 for engagement with the fastener 330 that is inserted into the body 110. In conjunction with FIGS. 1A and 1B, it can be seen that, as with the second pair of connecting posts 221, 223, the proximal ends of the first resilient leg 252 and the second resilient leg 254 are also connected to the top surface of the cylindrical tube 226 of the tubular portion 225. The first resilient leg 252 and the second resilient leg 254 are respectively located on the inner side of the first pair of connecting posts 222, 224, and the first resilient leg 252 and the second resilient leg 254 have a width substantially equal to the width of the first pair of connecting posts 222, 224. Therefore, in the side view shown in FIG. 2B, the first resilient leg 252 and the second resilient leg 254 are hidden by the first pair of connecting posts 222, 224.

The positions of the first resilient leg 252 and the second resilient leg 254 are symmetrical relative to the central axis 105, but the structures relative to the central axis 105 are not completely symmetrical. Specifically, the extension length of the first resilient leg 252 is greater than the extension length of the first resilient leg 252, and in a direction of the central axis 105, the bent portion 2523 of the first resilient leg 252 is higher than the bent portion 2543 of the second resilient leg 254. It is more favorable for the two resilient legs to engage with the threads of the fastener 330 if the engagement portions (bent portions) of the two resilient legs are arranged at different heights. It is desirable that the engagement portions of the two resilient legs both engage with recessed portions of threads of the fastener 330. Since the recesses of the threads on two sides of the fastener 330 are not symmetrical with respect to the axis of the fastener 330 and are staggered in the height direction of the fastener 330, the engagement portions (bent portions) of the two resilient legs are arranged at different heights, which is beneficial for both the engagement portions (bent portions) of the two resilient legs to engage with the recessed portions of the threads of the fastener 330, thereby increasing the removal force of the fastener 330.

As shown in FIG. 2C, the body 120 comprises the central channel 125 for receiving the fastener 330, the two pairs of connecting posts 221, 222, 223, 224 surround and form a part of the central channel 125, and an inner wall 2253 of the tubular portion 225 forms the other part of the central channel 125. The fastener 330 can be inserted into the central channel 125 from the distal end 2252 of the tubular portion 225. The width of the central channel 125 in a direction perpendicular to the central axis 105 is smallest at the segment of the cylindrical tube 226. That is, the inner diameter of the cylindrical tube 226 forms the minimum width of the central channel 125. The inner diameter of the cylindrical tube 226 is set to enable the insertion of the fastener 300 into the cylindrical tube 226. To prevent the fastener 300 from being in close contact with the inner wall of the cylindrical tube 226 so as not to hinder the insertion and removal of the fastener 330, the inner diameter of the cylindrical tube 226 is set to be slightly greater than the outer diameter of the fastener 330. The distance between the bent portion 2523 of the first resilient leg 252 and the bent portion 2543 of the second resilient leg 254 is smaller than the inner diameter of the cylindrical tube 226 and is smaller than the outer diameter of the fastener 330. The bent portion 2523 of the first resilient leg 252 and the bent portion 2543 of the second resilient leg 254 extend into the path of the fastener 330 in the central channel 125, so that the bent portion 2523 of the first resilient leg 252 and the bent portion 2543 of the second resilient leg 254 can engage with the fastener 330 that is inserted into the central channel 125.

Furthermore, the head 110 comprises a central aperture 215 extending through the head 110 along the central axis 105. The central aperture 215 is defined by the cylindrical main body 210. The central aperture 215 of the head 110 is aligned with the cylindrical tube 226 of the body 120, and the smallest dimension of the central aperture in the direction perpendicular to the central axis 105 is slightly greater than the outer diameter of the fastener 330, so that the central aperture 215 of the head 110 can also receive the fastener 330 that is inserted into the central channel 125 of the body 120. Due to the length of the fastener 330, the connecting posts of the body 120 can be set shorter by providing the central aperture 215 in the head 110 for receiving the fastener 330, so that the durability of the entire connector can be improved. In addition, by providing the central aperture 215 in the head 110 for receiving the fastener 330, during the process of connecting the two components by the connector 100, the insertion of the fastener 330 in the connector 100 can also be observed through the central aperture 215, so as to better determine whether the fastener 330 is inserted in place. Furthermore, it is worth noting that although the head 110 of the connector 100 of the present disclosure is provided with a central aperture 215, the head 110 may not be provided with the central aperture 215. These are all within the scope of protection of the present disclosure.

Figure 3A:
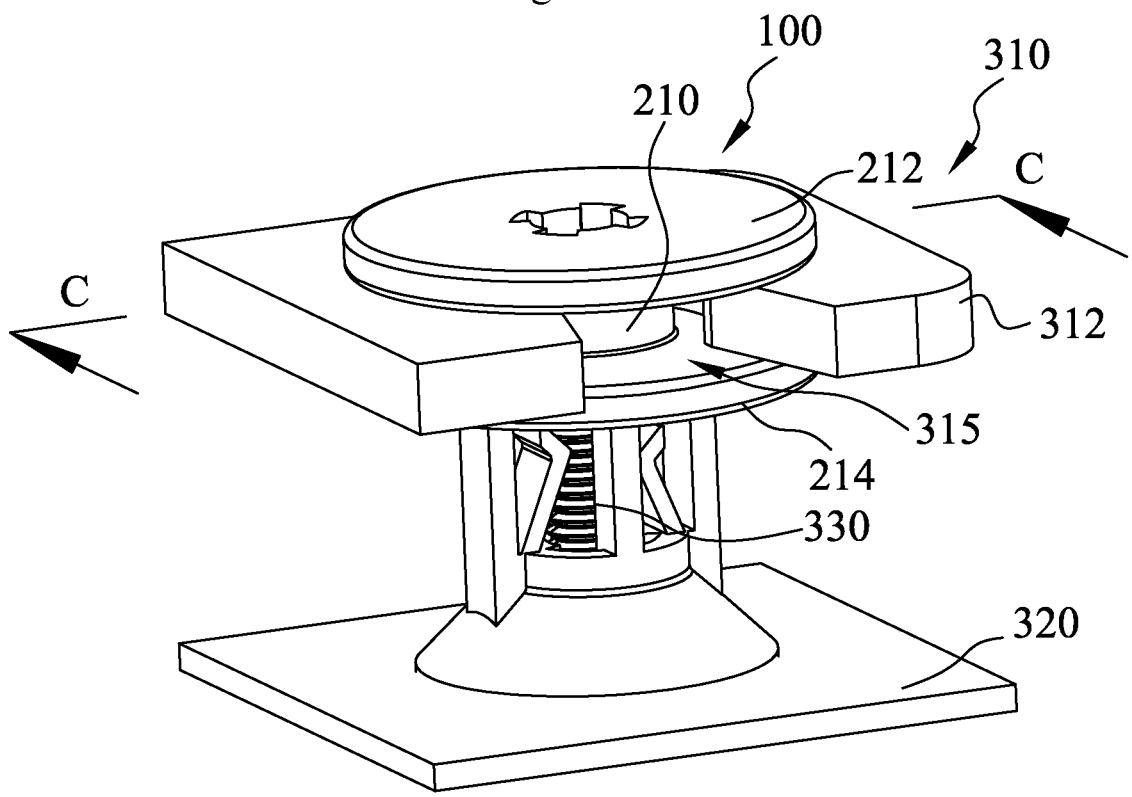
FIG. 3A shows a perspective view of the connector shown in FIG. 1A with multiple components connected together.
Figure 3B:
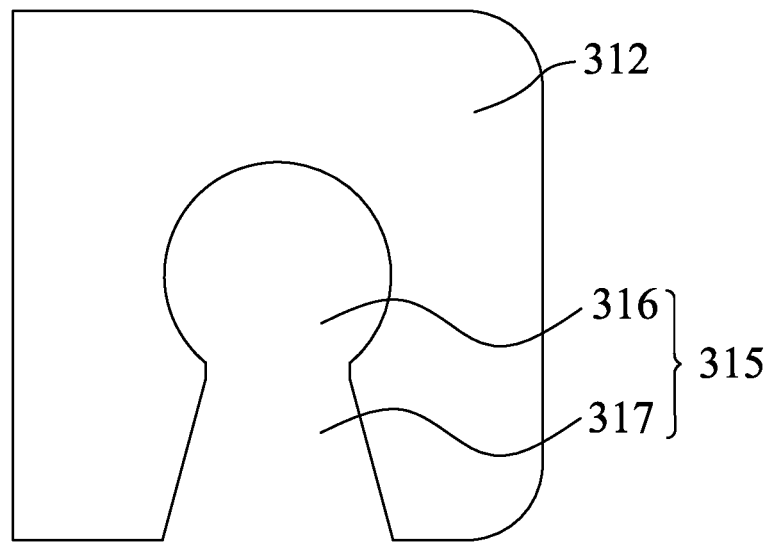
FIG. 3B is a top view of a mounting portion 312 of a first component 310 in FIG. 3A.
Figure 3C:
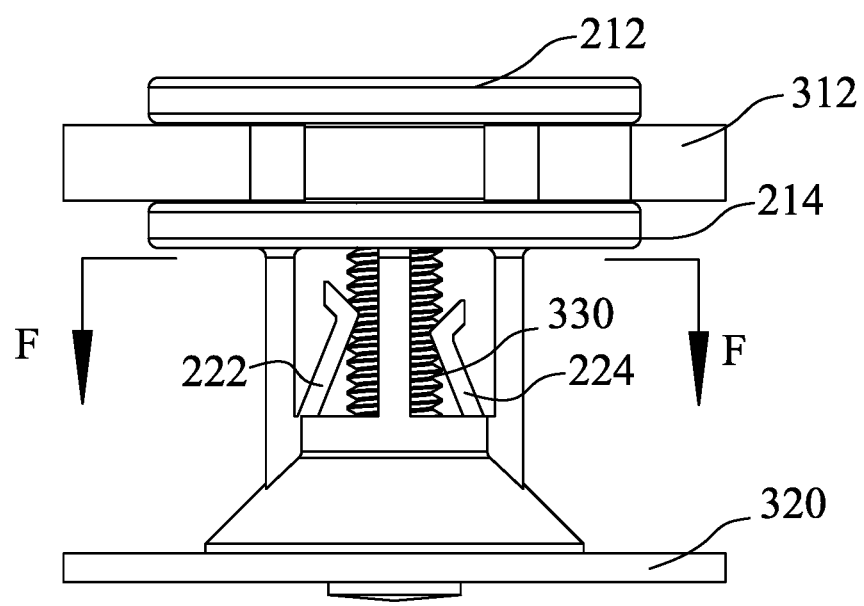
FIG. 3C is a side view of the first side of the connector shown in FIG. 3A.
Figure 3D:
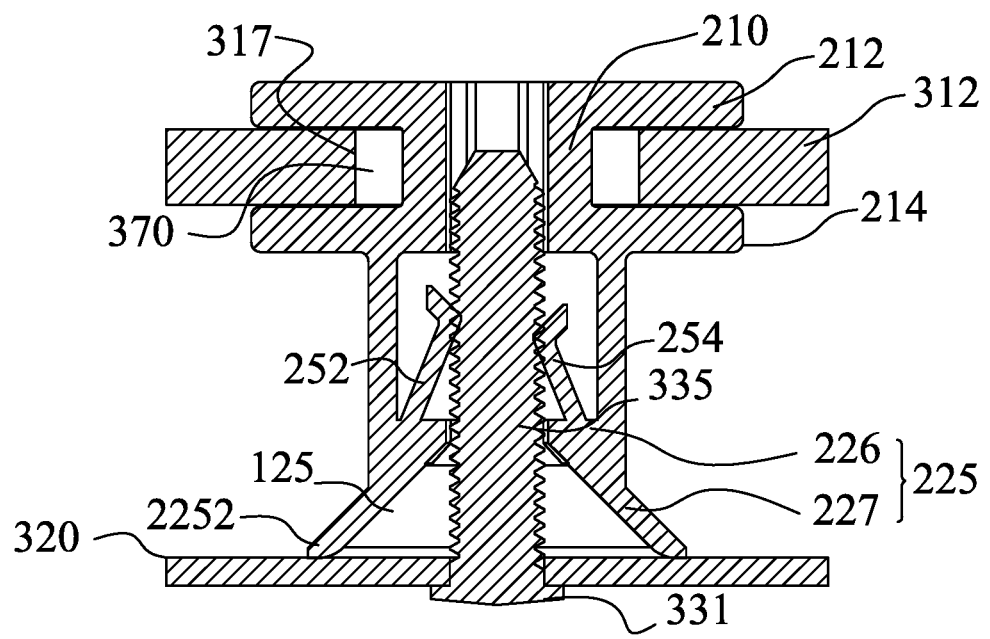
FIG. 3D is a cross-sectional view of the connector shown in FIG. 3A along a line C-C in FIG. 3A.
Figure 3E:
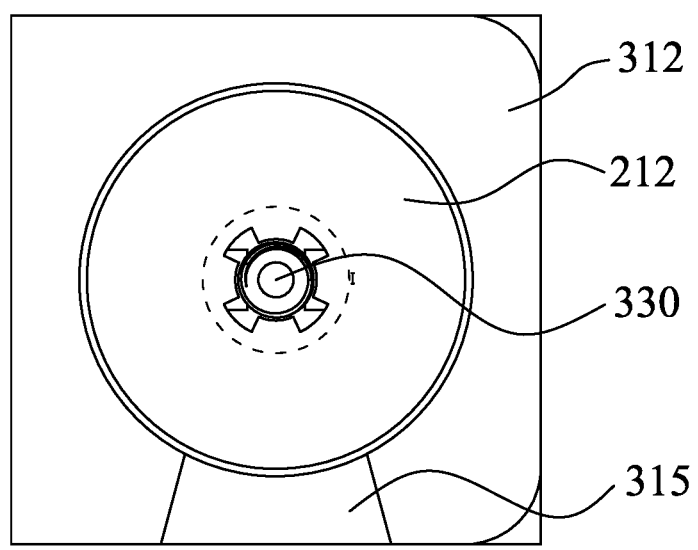
FIG. 3E is a top view of the connector shown in FIG. 3A.
Figure 3F:
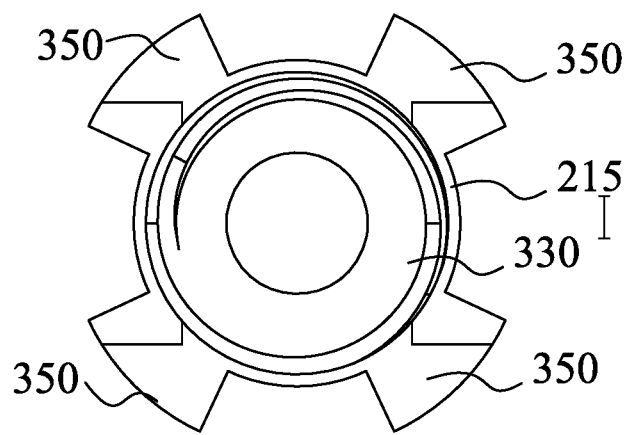
FIG. 3F is a partially enlarged view of a portion enclosed by the dashed line in FIG. 3E.
Figure 3G:
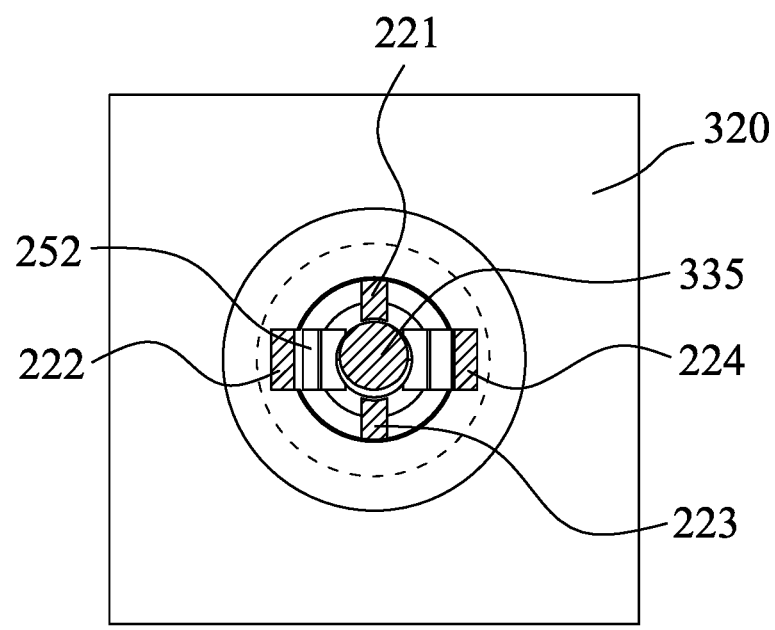
FIG. 3G is a cross-sectional view of the connector shown in FIG. 3A along a line F-F in FIG. 3C.
Figure 3H:
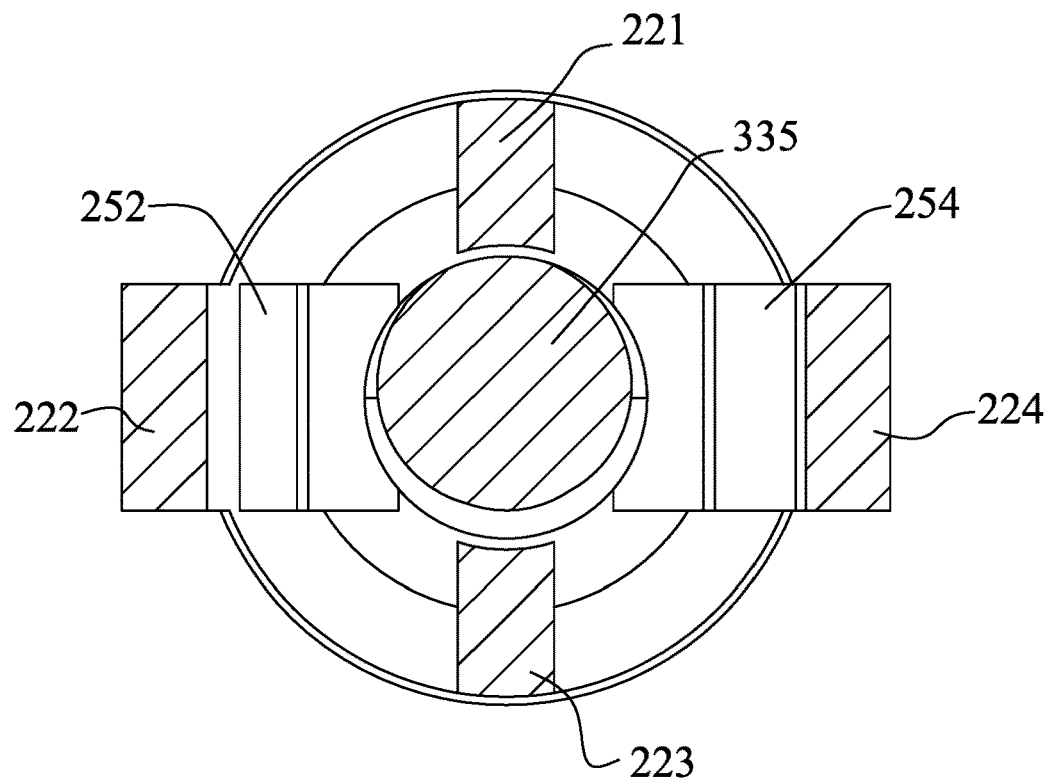
FIG. 3H is a partially enlarged view of a portion enclosed by the dashed line in FIG. 3G.

The specific assembly structure of the connector 100 shown in FIG. 1A, with multiple components connected together, is shown in FIGS. 3A-3E, in which FIG. 3A shows a perspective view of the connector shown in FIG. 1A with multiple components connected together, FIG. 3B is a top view of a mounting portion 312 of a first component 310 in FIG. 3A, FIG. 3C is a side view of the connector shown in FIG. 3A, FIG. 3D is a cross-sectional view of the connector along a line C-C in FIG. 3A, FIG. 3E is a top view of the connector shown in FIG. 3A, FIG. 3F is a partially enlarged view of a portion enclosed by the dashed line in FIG. 3E, FIG. 3G is a cross-sectional view of the connector along a line F-F in FIG. 3C, and FIG. 3H is a partially enlarged view of a portion enclosed by the dashed line in FIG. 3G.

As shown in FIGS. 3A-3D, the connector 100 is used to attach the first component 310 to the second component 320. To illustrate the assembly structure of the connector 100 more clearly, only a part of the first component 310 and a part of the second component 320 are shown in FIGS. 3A-3C. The first component 310 comprises a generally plate-shaped mounting portion 312 and is provided with an opening 315 in the mounting portion 312, and the main body 210 (similar to the neck ring) of the connector 100 that is located between the first flange 212 and the second flange 214 can be inserted into the opening 315 of the first component 310. The mounting portion 312 of the first component 310 can be clamped between the first flange 212 and the second flange 214 of the connector 100, and the first component 310 is thus held by the first flange 212 and the second flange 214 of the head 110 of the connector 100. The fastener 330 is connected to the second component 320. The fastener 330 is, for example, a screw, which comprises a head portion 331 and a rod portion 335 connected to the head portion 331, the rod portion 335 having threads. The fastener 330 passes from a first side (lower side) of the second component 320 to its opposite second side (upper side) through the second component 320. The head portion 331 of the fastener 330 is held on the first side of the second component 320 while the rod portion 335 of the fastener 330 extends from the first side to the second side of the second component 320. The rod portion 335 of the fastener 330 is inserted into the central channel 125 of the connector 100 to a depth such that the distal end 2252 of the tubular portion 225 of the connector 100 abuts against the surface of the second side of the second component 320. The pair of resilient legs 252, 254 of the connector 100 engage with the rod portion 335 of the fastener 330. In this way, the connector 100 attaches the first component 310 to the second component 320.

As shown in FIG. 3B, the opening 315 of the mounting portion 312 of the first component 310 comprises an inlet portion 317 and an accommodating portion 316. The accommodating portion 316 is substantially in the shape of a circular hole, and the inlet portion 317 is in the shape of flare. The inlet portion 317 communicates the accommodating portion 316 with the external environment. The main body 210 of the head 110 of the connector 100 that is located between the first flange 212 and the second flange 214 can be inserted into the accommodating portion 316 through the inlet portion 317. As shown in FIG. 3D, the inner diameter of the accommodating portion 316 of the opening 315 is greater than the outer diameter of the main body 210 of the head 110, and a gap 370 is formed between an outer peripheral surface of the main body 210 and an inner peripheral surface of the accommodating portion 316 of the opening 315. Furthermore, the minimum width of the inlet portion 317 of the opening 315 is also greater than the outer diameter of the main body 210. That is, the radial dimension of the opening 315 is greater than the outer diameter of the main body 210, and the main body 210 can move in the opening 315 in the direction perpendicular to the central axis 105. The above arrangement enables the connector 100 to move relative to the first component 310 in the direction perpendicular to the central axis 105 during the connection of the connector 100 with the fastener 330, which will be described in detail with reference to FIG. 4.

As shown in FIG. 3D, the inner diameter of the cylindrical tube 226 of the connector 100 is slightly greater than the outer diameter of the rod portion 335 of the fastener 330. As shown in FIGS. 3D-3F, the central aperture 215 of the head 110 of the connector 100 is generally a circular aperture centered on the central axis 105, and the central aperture 215 has four notches 350. The notches 350 expands a part of the central aperture 215 outward. The diameter of the central aperture 215 is also slightly greater than the outer diameter of the rod portion 335 of the fastener 330. As shown in FIGS. 3G and 3H, the pair of resilient legs 252, 254 engage with the rod portion 335 of the fastener 330, the second pair of connecting posts 221, 223 are at a distance from the rod portion 335 of the fastener 330 and not in contact therewith, and the first pair of connecting posts 222, 224 located on the outside of the pair of resilient legs 252, 254 are also not in contact with the rod portion 335 of the fastener 330. Therefore, during the insertion of the fastener 330 into the central channel 125 of the connector 100, none of the inner wall of the cylindrical tube 226, a hole wall of the central aperture 215 of the head 110 of the connector 100 and the second pair of connecting posts 221, 223 will block the movement of the fastener 330, nor will the insertion force and the removal force need to be increased due to excessive frictional resistance caused by contact with the fastener 300.

Figure 4:
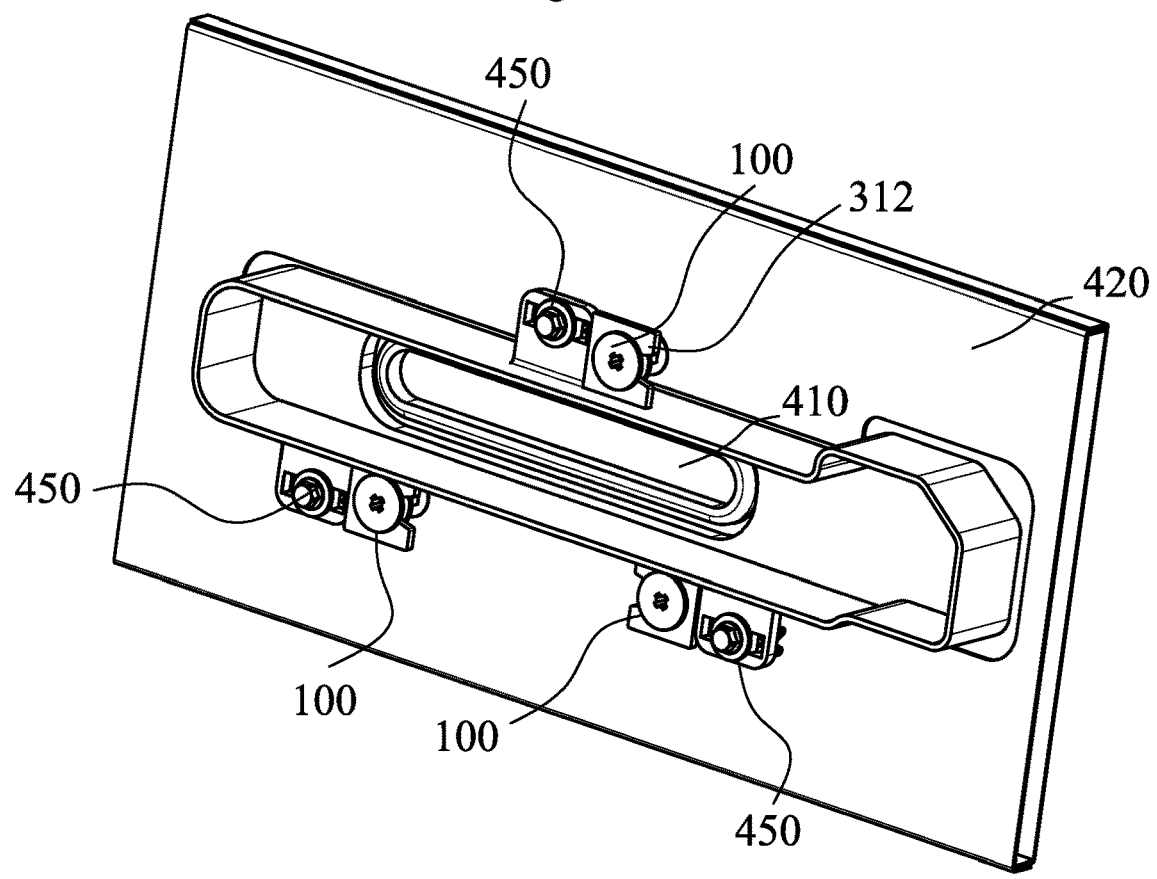
FIG. 4 is a use state diagram of the connector shown in FIG. 1A.

FIG. 4 is a use state diagram of the connector 100 shown in FIG. 1A, showing an exemplary actual use environment of the connector 100. As shown in FIG. 4, the connector 100 is used to attach a handle inner panel 410 (the first component 310) of a concealed door handle to a vehicle door panel 420 (the second component 320). There are three mounting points between the handle inner panel 410 of the door handle and the vehicle door panel 420, and at each mounting point, the handle inner panel 410 and the vehicle door panel 420 are fastened and connected by means of a set of fasteners 450 (such as bolts and nuts). Therefore, at each mounting point, the handle inner panel 410 and the vehicle door panel 420 are both provided with mounting holes aligned with each other, so as to facilitate the fastened connection. Before the handle inner panel 410 is fastened and connected to the vehicle door panel 420, the handle inner panel 410 is attached to the vehicle door panel 420 by means of the connector 100, so that the mounting holes of the handle inner panel 410 and the vehicle door panel 420 remain aligned at these three mounting points. To this end, at each mounting point, the handle inner panel 410 is provided with a mounting portion 312 for cooperating with the connector 100, and the fastener 330 is connected to the second component 320. After the mounting portion 312 of the handle inner panel 410 is clamped by the connector 100 at each connection point and the fastener 330 is mounted in place in the connector 100, the mounting holes of the handle inner panel 410 and the vehicle door panel 420 remain substantially aligned at the three mounting points, so that the fastened connection operation can be performed.

As shown in FIG. 3D, the radial dimension of the opening 315 of the mounting portion 312 of the handle inner panel 410 is greater than the outer diameter of the main body 210 of the head 110 of the connector 100, and the main body 210 can move in the opening 315. Therefore, during the process of connecting the connector 100 to the fastener 330, the connector 100 can move relative to the handle inner panel 410 in the direction perpendicular to the central axis 105. Consequently, even if the accuracy of the mounting position of the fastener 330 is not high enough at the three mounting points, each connector 100 can be connected to the fastener 330 in place because the respective connector 100 is not strictly fastened to the handle inner panel 410, and for this purpose, it is only necessary to adjust the position of the connector 100 relative to the handle inner panel 410 according to the position of the fastener 330. Therefore, by using the connector of the present disclosure, the operator can easily fasten and connect two components (e.g., the handle inner panel 410 and the vehicle door panel 420) by himself/herself, and the requirements for the manufacturing accuracy of the components are also reduced by using the connector of the present disclosure.

In addition, since the connector 100 is provided with the conical tube 227 that provides a conical guide surface, during the process of inserting the rod portion 335 of the fastener 330 into the central channel 125 of the connector 100, the fastener 330 first comes into contact with the conical inner wall of the conical tube 227 and is then guided by the conical inner wall of the conical tube 227 into the smaller-size cylindrical tube 226 and between the pair of resilient legs 252, 254. by providing the conical tube 227, the process of mounting and positioning the handle inner panel 410 and the vehicle door panel 420 is easier for the operator, because the inner diameter of the inlet of the conical tube 227 is much greater than the outer diameter of the fastener 330. The operator does not need to take effort to see if the fastener 330 is aligned with the central channel 125 of the connector 100, and it is also easier to simultaneously insert the fastener 330 into the central channel 125 of the connector 100 at the three mounting points.

It is worth noting that although in the embodiment shown in FIG. 4, the connector of the present disclosure is used for the mounting and positioning between two components (the handle inner panel 410 and the vehicle door panel 420), the connector of the present disclosure is by no means limited to the above-mentioned use environment, but can be used in any application where it is necessary to cooperate with a fastener (screw bolt) to attach two components to each other. Additionally, although one pair of resilient legs and two pairs of connecting posts are comprised in the embodiment of the present disclosure, more resilient legs and more or fewer connecting posts may be comprised in other embodiments. Although in the embodiment of the present disclosure, the body comprises connecting posts, the connecting posts may be replaced by a cylindrical tube with a larger inner diameter in other embodiments. These are all within the scope of protection of the present disclosure.

While the present disclosure has been described in conjunction with the specific embodiments shown in the accompanying drawings, it should be understood that various changes may be made to the connector of the present disclosure, without departing from the spirit, scope and background of the teaching of the present disclosure. Those of ordinary skill in the art would also have appreciated that there are different ways to alter the structural details in the embodiments disclosed in the present disclosure, which all fall within the spirit and scope of the present disclosure and the claims.

The invention claimed is:

1. A connector, comprising:
a head, wherein the head is configured to hold a first component;
a body, wherein the body is connected to the head, the body comprising a central channel extending along a central axis of the connector, and the central channel is configured to receive a fastener; and
at least two resilient legs, wherein the at least two resilient legs are connected to the body, wherein the at least two resilient legs include a first resilient leg and a second resilient leg, each of the first resilient leg and the second resilient leg define an extension length and a bent portion, the at least two resilient legs are configured to engage with the fastener that is inserted into the central channel to attach the connector to the fastener, wherein each of the first resilient leg and the second resilient leg consists of a lower segment that is disposed between the body and the bent portion and an upper segment that is disposed between the bent portion and the head, wherein each of the upper segments extends obliquely away from the bent portion to a distal end that is located farther from the central axis than the bent portion, such that the bent portion of each resilient leg forms an engagement portion that is positioned closest to the central axis for engagement with the fastener, and wherein the bent portion of each resilient leg is arranged at a different axial position relative to the central axis, such that an extension length defined by the lower segment of the first resilient leg is greater than an extension length defined by the lower segment of the second resilient leg.

2. The connector according to claim 1, wherein the body comprises:
at least two connecting posts, wherein the at least two connecting posts have first ends connected to the head and extend in a direction parallel to the central axis, and the at least two connecting posts are arranged around the central channel; and
a tubular portion, wherein the tubular portion is connected to second ends of the at least two connecting posts, and the tubular portion comprises an inner wall forming a part of the central channel.

3. The connector according to claim 2, wherein the tubular portion comprises a proximal end proximate to the head and a distal end remote from the head, and in the vicinity of the distal end the inner wall of the tubular portion is shaped as a truncated cone tapered in a direction from the distal end toward the proximal end.

4. The connector according to claim 3, wherein the tubular portion comprises a cylindrical tube forming the proximal end and a conical tube forming the distal end, the conical tube is connected to the cylindrical tube and is tapered in the direction from the distal end toward the proximal end, and the cylindrical tube has an inner diameter equal to a minimum inner diameter of the conical tube.

5. The connector according to claim 3, wherein the at least two resilient legs are connected to the proximal end of the tubular portion.

6. The connector according to claim 1, wherein the head comprises a main body, and a first flange and a second flange wherein the first flange and a second flange are arranged around the main body and protrude radially, the first flange and the second flange are spaced apart by a predetermined distance for clamping the first component, and the main body is insertable into an opening of the first component.

7. The connector according to claim 6, wherein the main body of the head is movable in the opening of the first component.

8. The connector according to claim 6, wherein the first flange and the second flange are configured as annular platforms.

9. The connector according to claim 1, wherein the head comprises a central aperture, and the central aperture is in communication with the central channel of the body and is configured to receive the fastener.

10. The connector according to claim 1, wherein an axial section of the head is I-shaped.

* * * * *